(12) United States Patent
Vignet (10) Patent No.: US 7,176,923 B2
(45) Date of Patent: Feb. 13, 2007

(54) METHOD AND SYSTEM TO GENERATE CHART MODELS

(75) Inventor: Peter Vignet, San Francisco, CA (US)

(73) Assignee: SAP Rechnungsprufung, Walldorf (DE)

( * ) Notice: Subject to any disclaimer, the term of this patent is extended or adjusted under 35 U.S.C. 154(b) by 225 days.

(21) Appl. No.: 10/871,095

(22) Filed: Jun. 18, 2004

(65) Prior Publication Data

US 2005/0283754 A1 Dec. 22, 2005

(51) Int. Cl.
*G06T 11/20* (2006.01)

(52) U.S. Cl. .................. 345/440; 715/509; 715/906

(58) Field of Classification Search ............ None
See application file for complete search history.

(56) References Cited

U.S. PATENT DOCUMENTS

| 5,272,628 | A  | * | 12/1993 | Koss ..................... 715/503 |
| 6,144,379 | A  | * | 11/2000 | Bertram et al. ........... 715/835 |
| 6,320,586 | B1 | * | 11/2001 | Plattner et al. .......... 715/700 |
| 6,356,896 | B1 | * | 3/2002  | Cheng et al. ............. 707/4 |
| 6,363,394 | B1 | * | 3/2002  | Rajarajan et al. ........ 707/102 |
| 6,937,257 | B1 | * | 8/2005  | Dunlavey ................ 715/763 |

OTHER PUBLICATIONS

Author: Ed Bott, Woody Leonhard Title: Using Microsoft Office 2000 Date: 1999 Publisher: Que Corporation Edition: Special edition pp. iii, 535-536, 539-540, 552, 581-583.*

* cited by examiner

*Primary Examiner*—Mark Zimmerman
*Assistant Examiner*—David Chu (57) ABSTRACT

A method and system to generate chart models are disclosed. Graphs may be rendered more efficiently by utilizing chart models, where multiple chart models are be generated utilizing the same set of chart data. Each chart model may be utilized to render a corresponding chart. In order to generate a chart model, a set of data may be totally disassembled first and then reassembled in an appropriate manner (e.g., according to a desired chart description). Disassembling may include, from a set of data, extracting data corresponding to all X coordinates (all abscissas), extracting data corresponding to all categories, and extracting the values corresponding to each abscissa-category pair. Reassembling may include generating a new set of data or a model, according a sorting logic.

20 Claims, 7 Drawing Sheets

```
package bean;
/*
* A very simple bean whose only purpose is
* to store a simple String.
* It as a get and set method to store and recall the string.

*/
public class DynPageNameBean
{
public String name;
public String getName ()
{
return name;
}
public void setName (String name)
{
 this.name = name;
}
```

METHOD AND SYSTEM TO GENERATE CHART MODELS

FIELD OF THE INVENTION

An embodiment relates generally to enterprise resource and program management, and more particularly to a method and system to generate chart models.

BACKGROUND OF THE INVENTION

Software applications in the field of enterprise resource and program management attempt to integrate all facets of a business including planning, manufacturing, sales, and marketing. As the resource and program management methodology has become more popular, software applications have emerged to help users implement resource and program management in business activities to provide visibility into the entire portfolio of enterprise programs and projects, while supporting strategic capacity planning and resource allocation based on up-to-date information on skills and availability of the resources. It is desirable that an enterprise resource and program management tool is capable of leveraging data from base systems without disruption, and can be delivered at an effective and predictable cost.

A resource and program management system may enable users to manage and execute complex information technology (IT) and research and development (R&D) projects. Such system may, for example, integrate information from existing project management, human resources, financial, and time-tracking systems in order to provide a complete overview of a project portfolio. Business data may be presented to a user in a tabular form as well as in a form of graphs and charts. A good user experience may result from easy rendering of business graphics in a portal page.

SUMMARY OF THE INVENTION

A method and system to generate chart models is described. According to one aspect, a system to create a chart includes an extractor to receive chart data; a table model generator to generate a key table model suitable for representing the chart data in a key-value format; a chart model template generator to generate a chart model template utilizing the abscissas table model and the categories table model; a chart models generator to generate a master chart model utilizing the abscissas per category table model and the chart model template; and a display model to render a chart utilizing the master chart model.

According to a further aspect, the chart data includes a plurality of values, each value of the plurality of values being associated with a respective abscissa, of a plurality of abscissas, for a category, of a plurality of categories. The key table model includes an abscissas table model, a categories table model, and an abscissas per category table model.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to generate chart models are described. In the following description, for purposes of explanation, numerous specific details are set forth in order to provide a thorough understanding of the present invention. It will be evident, however, to one skilled in the art that the present invention may be practiced without these specific details.

In a web-based environment, graphics (e.g., a graph or a chart) are often rendered to a user utilizing an applet (e.g., a Java applet), which may be run within an Internet browser. A Java applet may be resource intensive. It may require loading a number of data for each graph and, depending on a client machine, there may be a considerable delay in transferring data and rendering the graph. A method to render graphics more efficiently may prove beneficial in a resource and program management environment.

In one embodiment, graphs may be rendered more efficiently by utilizing chart models, where multiple chart models may be generated utilizing the same set of chart data. Each chart model may be utilized to render a corresponding chart (e.g., in an exemplary form of a bar graph or a pie chart). Thus, one back end call may be required for all chart rendering (e.g., tables and graphs), which, in turn, may favorably affect back end performance.

In order to generate a chart model, a set of data (e.g., chart data) may be totally disassembled first and then reassembled in an appropriate manner (e.g., according to a desired chart description). Disassembling may include, from a set of data, extracting data corresponding to all X coordinates (all abscissas), extracting data corresponding to all categories, and extracting the values corresponding to each abscissa-category pair. At the end of the disassembly process, descriptions of each abscissa for each category are sorted and stored in a first table, descriptions of each category are sorted and stored in a second table, and all values for each abscissa-category pair are sorted and stored in a third table. Reassembling may include generating a new set of data or a model, according a sorting logic. This approach may contribute to versatility of charts generation, enhanced performance, and consistency of data.

According to one exemplary embodiment, a chart model for a business chart may include one or more categories (e.g., types of expenses) and a set of abscissas (e.g., months of a year), where each category has one value per an abscissa (e.g., dollar amount). Thus, a chart model may represent a dollar amount expended per month for each type of expenses. It will be noted, that, in this example, abscissas for each category are selected from one set of abscissas (here, months of a year), that abscissas can be ordered in an ascending order, and that each category has only one value per abscissa (here a dollar amount per month).

It will be noted, that categories and abscissas may be interchangeable (commutative), where an abscissa-category pair has the same associated value as a category-abscissa pair, if the abscissa is the same in both pairs and the category is the same in both pairs. Thus, in the example above, the original data may be represented in terms of a dollar amount expended per month for each type of expenses, as well as a dollar amount expended per each type of expenses for each month. In one embodiment, when a chart is rendered, each category may have a color attached to it.

An exemplary set of data may be represented in a tabular form as follows:

TABLE 1

| Categories | X (Abscissas) | Y (Values) |
|---|---|---|
| C1 | X1 | Yc1x1 |
|  | X2 | Yc1x2 |
| C2 | X1 | Yc2x1 |
|  | X2 | Yc2x2 |

Figure 1:
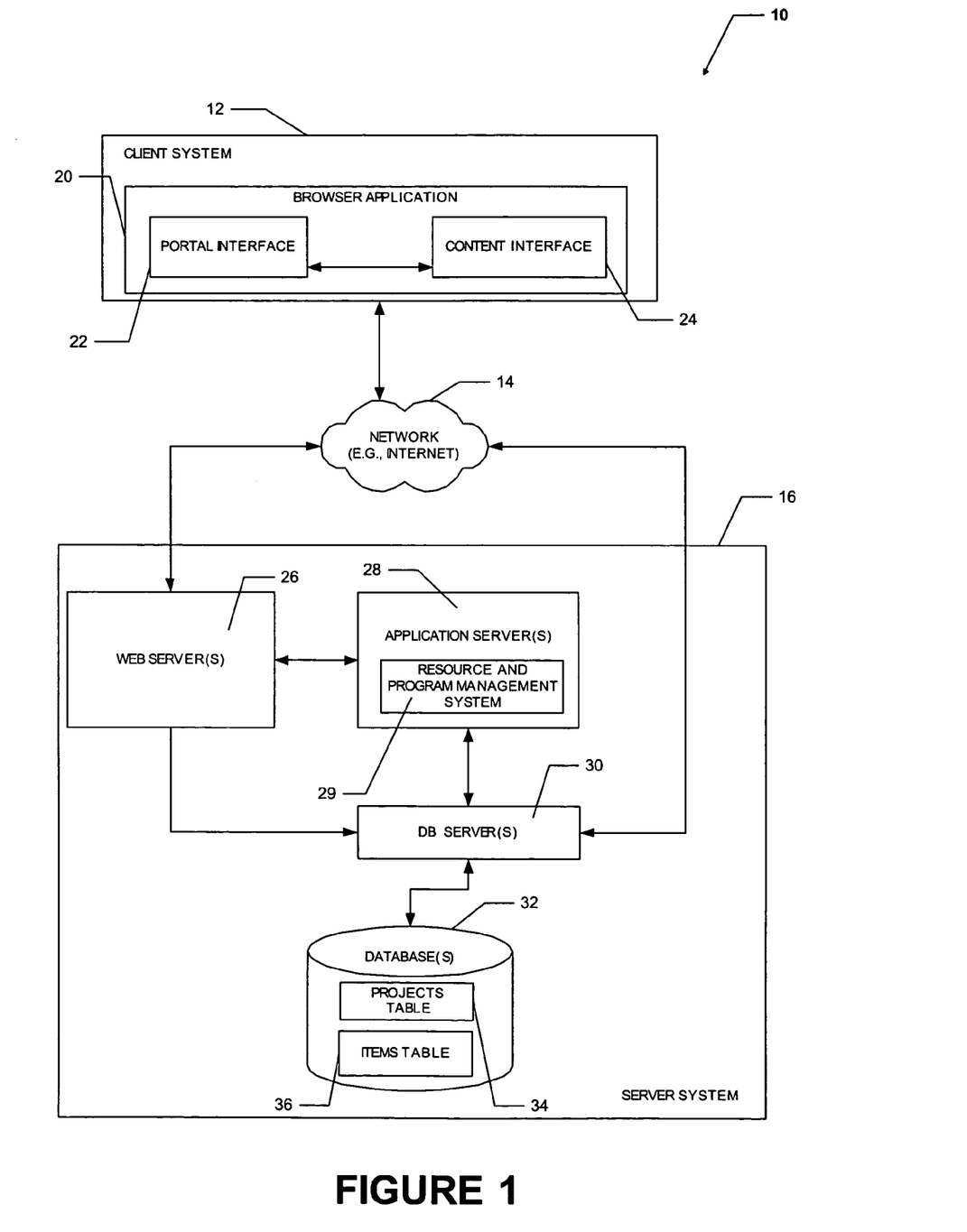
FIG. 1 is a network diagram depicting a system having a client-server architecture, according to one embodiment of the present invention.

FIG. 1 is a network diagram depicting a system 10, according to one exemplary embodiment of the present invention, having client-server architecture. A client system 12 is coupled via a network 14 (e.g., the Internet or an intranet) to a server system 16, so as to facilitate communications (e.g., utilizing any one of a number of well-known network communication protocols, such as HTTP) between the client system 12 and the server system 16. In FIG. 1, the client 12 may be any computing device, including a laptop computer, notebook computer, personal digital assistant (PDA), or handheld wireless phone. The client system 12 may further host a number of client applications, such as a browser application 20 (e.g., MS EXPLORER®, developed by Microsoft Corporation of Redmond, Wash. The browser application 20 may include a portal interface 22 and a content interface 24.

In one exemplary embodiment, the portal interface 22 may facilitate user access to one or more applications hosted on the application server 28, such as a resource and program management system. The portal interface 22 is shown to invoke the content interface 24 within which content associated with a web-based application may be presented to a user. Specifically, the content interface 24 may communicate with the one or more applications hosted on the application server 28, at least one of which may be responsible for the delivery of content to the content interface 24. Both the portal interface 22 and the content interface 24 may communicate with the server system 16 via the network 14.

The server system 16, in one exemplary embodiment, may include a web server 26, an application server 28, and a database (DB) server 30. The database server 30 may be connected a database 32. The application server 28 may be deployed to support one or more applications, and may utilize the database server 30 to store and to retrieve data from a database 32. The database 30 may, for example, store data such as project information in an exemplary form of projects table 34, item information in an exemplary form of items table 34, and other information. The data within the database 32 may be stored in any one of a number of forms, such as, for example, flat files, relational tables objects, or as XML (extensible Markup Language) data structures. The application servers 28 may also be coupled to one or more web servers 26, so as to facilitate the delivery of web content, including content containing embedded code, such as Java, to the portal interface 22 and the content interface 24.

In one embodiment, a resource and program management system 29 resides on the application server 28. The resource and program management systems may be utilized, for example, to allow a user to view business data as a chart (e.g., as a table, as a bar graph, or as a pie chart).

Figure 2:
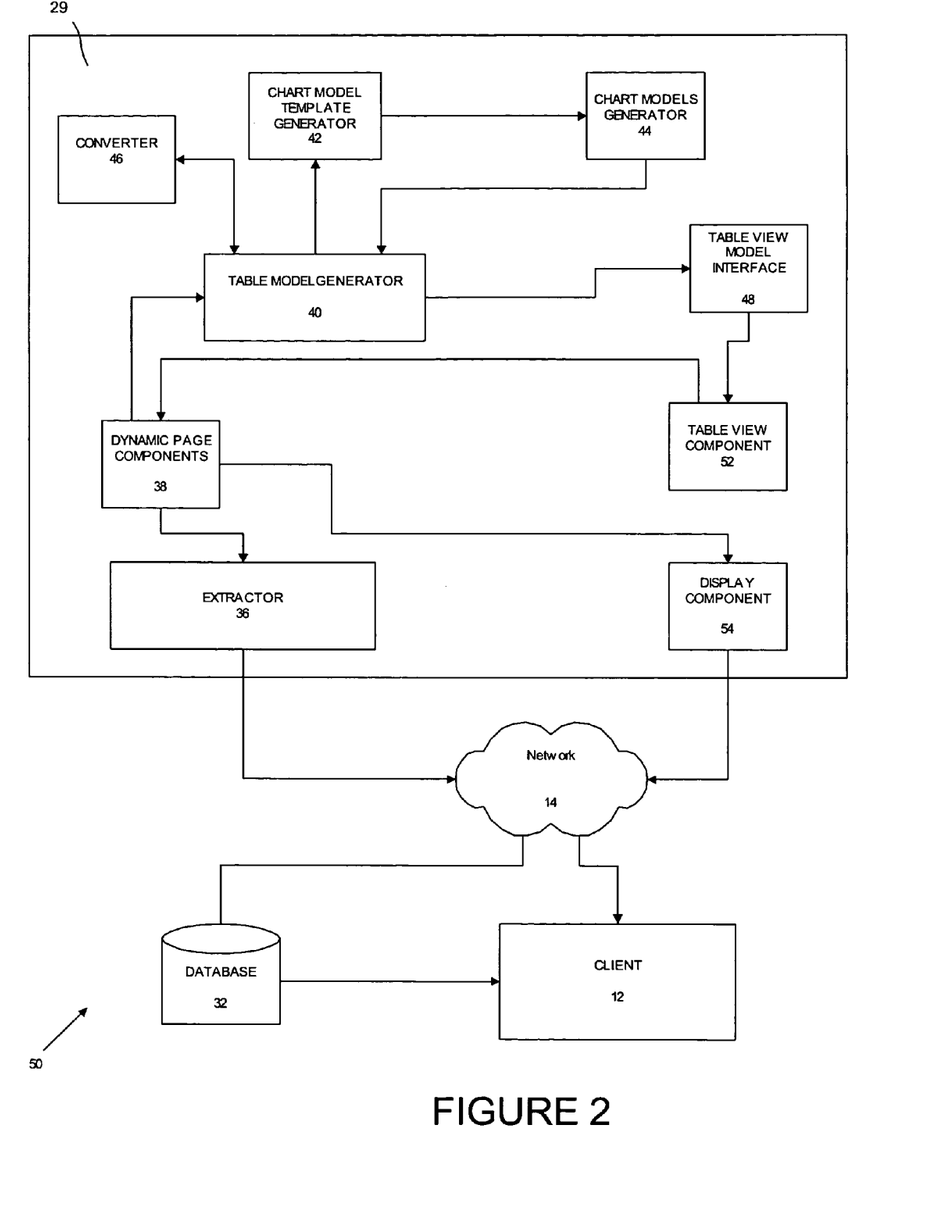
FIG. 2 is a block diagram illustrating a system to generate chart models in an enterprise resource and program management environment, according to one embodiment of the present invention.

FIG. 2 is a block diagram illustrating a system 50 to generate chart models in a resource and program management environment, according to one embodiment of the present invention. A business platform, in the exemplary form of the network-based resource and program management system 29, provides server-side functionality, via the network 14 (e.g., the Internet) to the one or more clients 12. The resource and program management system 29 may be configured to provide a number of business management functions and services to users.

The system 50 allows the client 12 to request and receive a graphical representation of business data. The resource and project management system 29 may include an extractor 36, dynamic page components 38, table model generator 40, a chart model template generator 42, a chart models generator 44, a converter 46, a table view model interface 48, a table view component 52, and a display component 54. The extractor 36 may be configured to receive a client's request for a chart in accordance with the client's business data. The client's business data may be stored in the database 32.

The dynamic page component 38 may be configured to receive business data from the extractor 36 and to provide this data to the table model generator 40. The dynamic page component 38 may generate dynamic web pages and provide them to the display component 54. In order to provide a chart representation of data within a dynamic web page, the dynamic page component 38 requests one or more chart models to be generated by the chart models generator 44. The chart models generator 44, in turn, utilizes the chart template generator 42 to generate a chart model. The chart template generator 42 may be configured to disassemble business data provided by the extractor 36, such that for each category there is an associated full set of abscissas, and such that a value can be assigned to each category-abscissa pair. A chart model may be represented in a tabular form. Also eventually a table view component 52 may be utilized by the table model generator 40 to access table view classes and to generate tabular representation of the chart model.

The converter 46 may be utilized, where the original business data received at the extractor 36 is represented by non-uniform units. For example, business expenses data may be provided in terms of a dollar amount per month for the first year, and in terms of a dollar amount per year for the second year and for the third year. In other words, the abscissas are represented by non-uniform units. In order to have a uniform granularity of the abscissas in this example, the converter 46 may utilize a larger time unit (here, a year) and apply predetermined logic to calculate a dollar amount per year for the first year.

In one embodiment, the converter 46 may be utilized, where the values in the original business data are represented by non-uniform units (e.g., USD and EUR). In this example, the converter 46 may be configured to convert all values in the original business data into the same predetermined currency (e.g., utilizing a currency conversion table).

Figure 3:
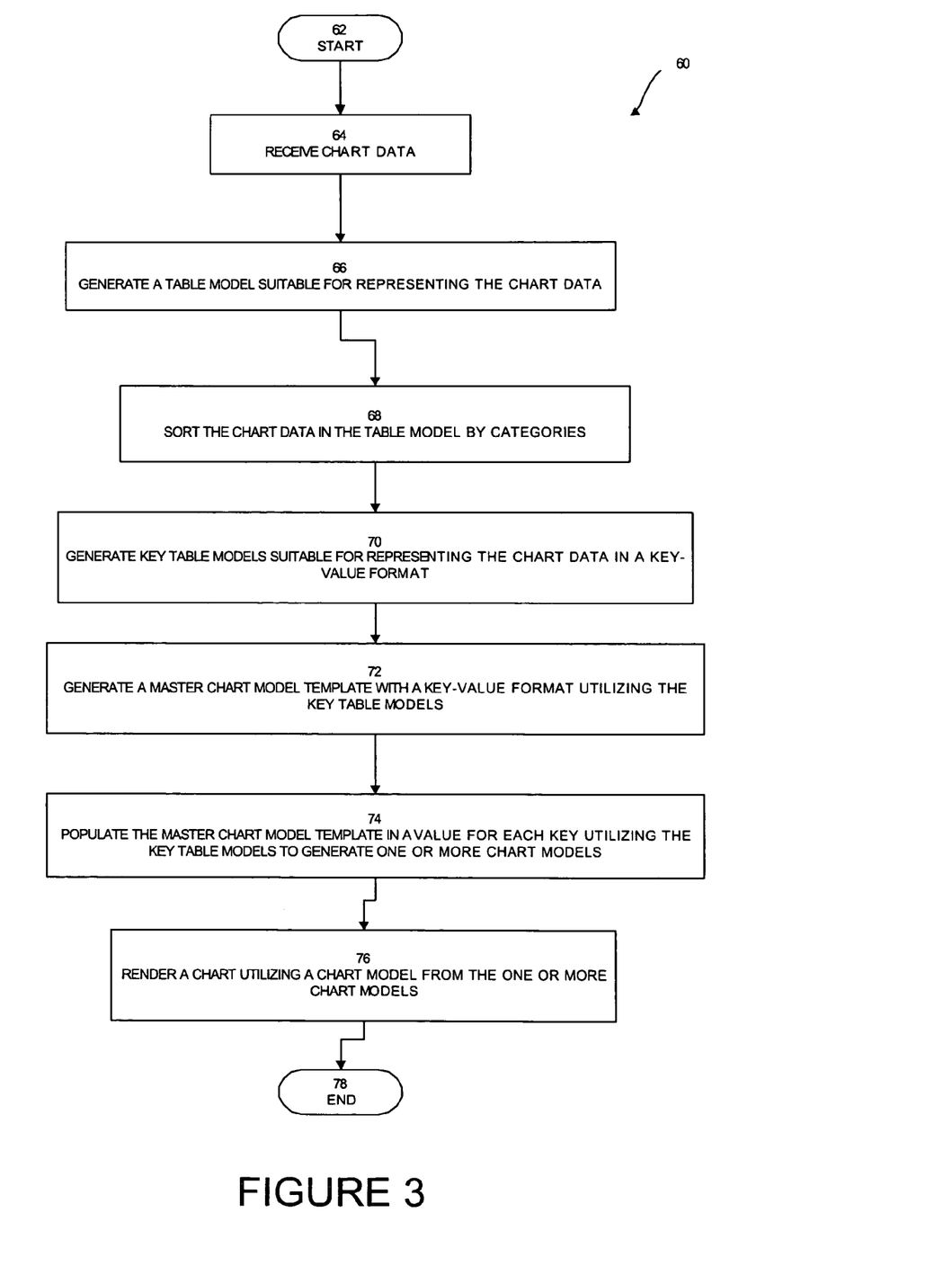
FIG. 3 is a flowchart illustrating a method to generate chart models, according to one embodiment of the present invention.

FIG. 3 is a flow chart illustrating a method 60 to generate chart models, according to one embodiment of the present invention. The method 60 commences at operation 62. At operation 64, the system 29 receives business data, which may be termed chart data, and a request for a graphical representation of the business data via the extractor 36. Exemplary data may be represented as follows:

TABLE 2

| X (Abscissas) | Categories | Y (Values) |
|---|---|---|
| X0 | C1 | Yc1x0 |
| X3 | C1 | Yc1x3 |
| X1 | C2 | Yc2x1 |
| X2 | C2 | Yc2x2 |
| X3 | C2 | Yc2x3 |

Figure 4A:
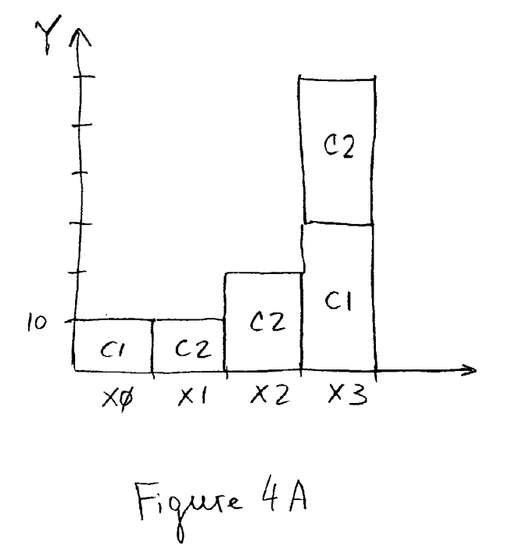
FIGS. 4A through 4D illustrate exemplary charts generated by the system, according to one embodiment of the present invention
Figure 4B:
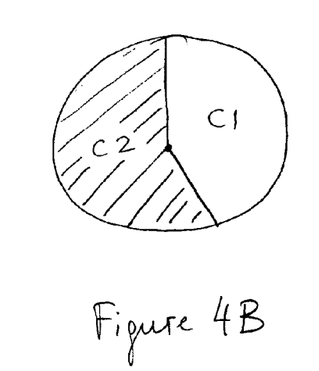

The requested graphical representation of the business data may include, for example, one stacked bar graph and one pie chart. The requested stacked bar graph, in this example, may be to represent each X (abscissa) having summed Ys (values) by category, where the height of each category is proportional to the summed Ys, as illustrated in FIG. 4A. Each slice of the requested pie chart is to represent the sum of all values associated with one category, as illustrated in FIG. 4B.

At operation 66, the table model generator 40 generates a table model (e.g., a vector table) suitable for representing chart data such as the business data received at operation 64. The chart data is placed in a vector table to form a table view model sorted by categories and by increasing abscissas, at operation 68, as shown in Table 3.

TABLE 3

| Categories | X | Y (numeric value) |
|---|---|---|
| C1 | X0 | Yc1x0 (=10) |
|  | X3 | Yc1x3 (=30) |
| C2 | X1 | Yc2x1 (=10) |
|  | X2 | Yc2x2 (=20) |
|  | X3 | Yc2x3 (=30) |

It will be noted, that in the table view model illustrated in Table 3, category C1 does not have a value for either X1 or X2, and category C2 does not have a value for X1.

At operation 70, the table model generator 40 generates key table models suitable for representing chart data in a key-value format. Continuing with the example above, a sorted table is generated to store values for each abscissa in the chart data, utilizing the table model created at operation 66. The sorted table, in this example, is a sorted tree map to keep unique keys strictly in the same order, as illustrated in Table 4.

TABLE 4

| Key | Value |
|---|---|
| X0 | Description X0 (January) |
| X1 | Description X1 (February) |
| X2 | Description X2 (March) |
| X3 | Description X3 (April) |

The table model generator 40 further generates a table, as illustrated by Table 5, to store values for each category in the chart data, utilizing the table model created at operation 66. Table 5 may be a sorted tree map to keep unique keys strictly in the same order.

TABLE 5

| Key | Value |
|---|---|
| C1 | Description C1 (Budgeted Cost.) |
| C2 | Description C2 (Non Budgeted Cost) |

The table model generator 40 further generates a values table, as illustrated by Table 6, to store all values for abscissa-category pairs, utilizing the table model created at operation 66. Table 6 may be, for example, a hash table.

TABLE 6

| Key | Value |
|---|---|
| X0-C1 | Yc1x0 (=10) |
| X1-C2 | Yc2x1 (=10) |
| X2-C2 | Yc2x2 (=20) |
| X3-C1 | Yc1x3 (=30) |
| X3-C2 | Yc2x3 (=30) |

At operation 72, the chart model template generator 42 generates a master chart model template in a key-value format, utilizing the key table models (here, Table 4, Table 5, and Table 6). Each category of the master chart model template has the same number of abscissas. Each abscissa maintains its value independent of its association with a category (e.g., X0 is always "Jan."). The master chart model template is illustrated in Table 7. It will be noted, that Table 7 includes a value placeholder (e.g., a default value of a zero) for each abscissa-category pair, unlike the examplary chart data received at operation 64, which, for example, did not include a value for X0-C2 pair.

TABLE 7

| Key | Value |
|---|---|
| X0-C1 | 0 |
| X0-C2 | 0 |
| X1-C1 | 0 |
| X1-C2 | 0 |
| X2-C1 | 0 |
| X2-C2 | 0 |
| X3-C1 | 0 |
| X3-C2 | 0 |

At operation 72, the chart models generator 44 populates the master chart model with a value for each key, utilizing the values table (in this example, Table 6) to generate a chart model represented by Table 8. The chart model represented by Table 8 is keyed by abscissa-category pairs, which may be used to render the requested stacked bar graph, where each abscissa has summed values by category. It will be noted, that values for abscissa-category pairs that are not present in the values table maintain a default value (e,g., a zero). Table 8 illustrates a chart model created at operation 72, which may be utilized to generate a stacked bar graph requested at operation 64.

TABLE 8

| Key | Value |
|---|---|
| X0-C1 | 10 |
| X0-C2 | 0 |
| X1-C1 | 0 |
| X1-C2 | 10 |
| X2-C1 | 0 |

TABLE 8-continued

| Key | Value |
|---|---|
| X2-C2 | 20 |
| X3-C1 | 30 |
| X3-C2 | 30 |

A stacked bar graph that can be generated utilizing the chart model of Table 8 is illustrated in FIG. 4A.

The chart models generator 44 may be utilized to generate multiple chart models to accommodate different chart requests from a user. A pie chart request where each slice represents the sum of values for an associated category may be generated by utilizing a chart model represented by Table 9. The chart model represented by Table 9 may be generated utilizing the master chart model by summing all values by category. Table 9 is keyed by category, where the value for each category is the sum of values of associated abscissas. A pie chart that can be generated utilizing the chart model of Table 9 is illustrated in FIG. 4B.

TABLE 9

| Key | Value |
|---|---|
| C1 | 10 + 30 = 40 |
| C2 | 10 + 20 + 30 = 60 |

Figure 4C:
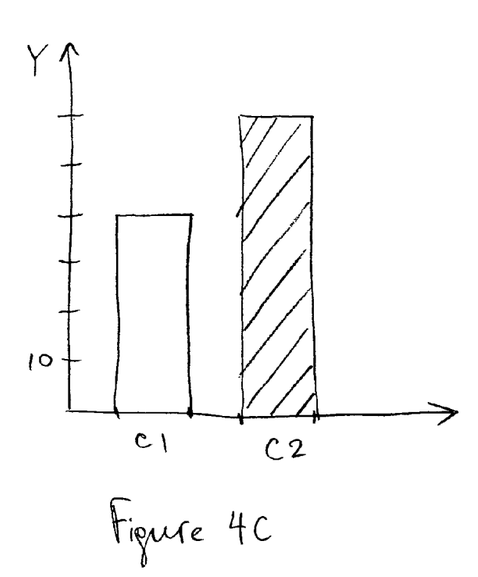

It will be noted that the chart model represented by Table 9 may also be utilized to generate a bar graph as illustrated in FIG. 4C.

Figure 4D:
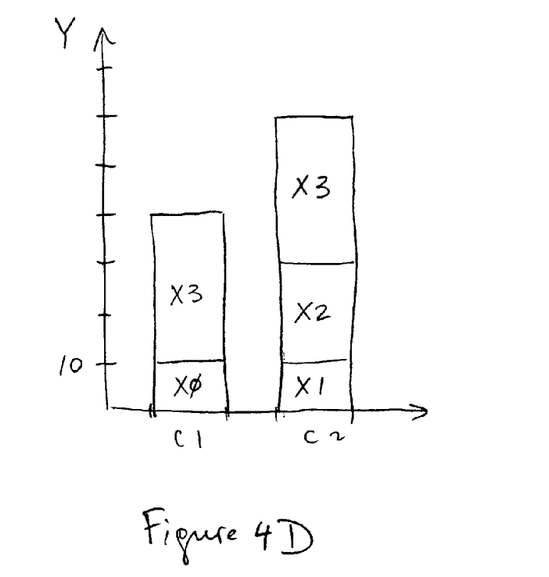

The master chart model may be utilized to create a chart model, represented in table 10, keyed by category-abscissa pairs, each category-abscissa pair having an associated value. A stacked bar graph that can be generated utilizing the chart model of Table 10 is illustrated in FIG. 4D.

TABLE 10

| Key | Value |
|---|---|
| C1-X0 | 10 |
| C1-X1 | 0 |
| C1-X2 | 0 |
| C1-X3 | 30 |
| C2-X0 | 0 |
| C2-X1 | 10 |
| C2-X2 | 20 |
| C2-X3 | 30 |

Returning to FIG. 3, at operation 76, a chart (e.g., a bar graph or a pie chart) is rendered utilizing the chart model generated at operation 72 or at operation 74. The chart models generator 44 may be configured to attach a color to a category in a set of data, such that the category may have the same color in every type of a chart (e.g., a bar graph or a pie chart) generated for a particular set of data.

The method and system to generate chart models may be extended to scenarios where a business data category has one or more sub categories. For example, business data may include a "Budgeted expenses" category and "Non Budgeted expenses" category. Each of these categories may in turn include a "material" subcategory and a "labor" sub category. In such a case, the chart models generator 44 generates a table to store values for each subcategory. The table to store values for each sub category may have a composite key, the composite key including a category and a subcategory. Similarly, a master chart model (C-Sub-X) may include a value for each category-subcategory-abscissa set. It will be noted that the number of models that may be generated utilizing the master chart model is increased where a category includes subcategories. Thus, in this example, the chart models generator 44 may generate the following chart models in addition to the master chart model: C-X-Sub, Sub-C-X, Sub-X-C, X-C-Sub, X-Sub-C.

In one embodiment, the method and system to generate chart models may be extended to scenarios where abscissa (X) units have sub units. For example, an X unit may be a year, and the X sub unit may be a month. The logic applied to subcategories in the example above can be utilized to generate a sorted table to store values for all units and subunits, as well as to generate a sorted table to store values for each category-unit-subunit group. Thus, the chart models generator 44 may be configured, in one exemplary embodiment, to generate a chart model for a stacked bar graph for year expenses per month, to allow comparison of monthly expenses.

Returning to FIG. 1, the resource and program management system 29 may provide business management tools to a user, such as resource and program management. The system 29 may utilize information related, for example, to projects and items stored in the database 32 in order to provide a chart image (e.g., a bar graph or a pie chart) to the user. It is desirable to provide a user with a graphical user interface (GUI) that allows the user to modify the project data within the chart view and to enable the user to view additional information related to the chart as the user clicks on a particular image within the chart or, for example, places the cursor over the image.

The HTML-Business for Java (HTMLB) controls may be necessary to create a GUI. HTMLB allows creating a design-oriented page layout. HTMLB may provide a user with a set of controls. The controls may be based, for example, on servlets and Java Server Pages (JSP) pages. A developer may use bean-like components or JSP tags. Renderer classes may be utilized to translate various components into HTML commands.

In addition to creating a proper GUI, a web application may need appropriate event handling to fill the application with live feed. There may be a number of controls that generate events. Java Server Pages (JSP) technology provides a simplified, fast way to create web pages that display dynamically generated content. The basic event handling occurs on the JSP level. The dynamic page component 18 may be used for enhanced event handling and easy session management. The dynamic page component 18, in one embodiment, uses the Business HTML for Java as API to design the GUI and handles the data and event transfer.

Figure 5:
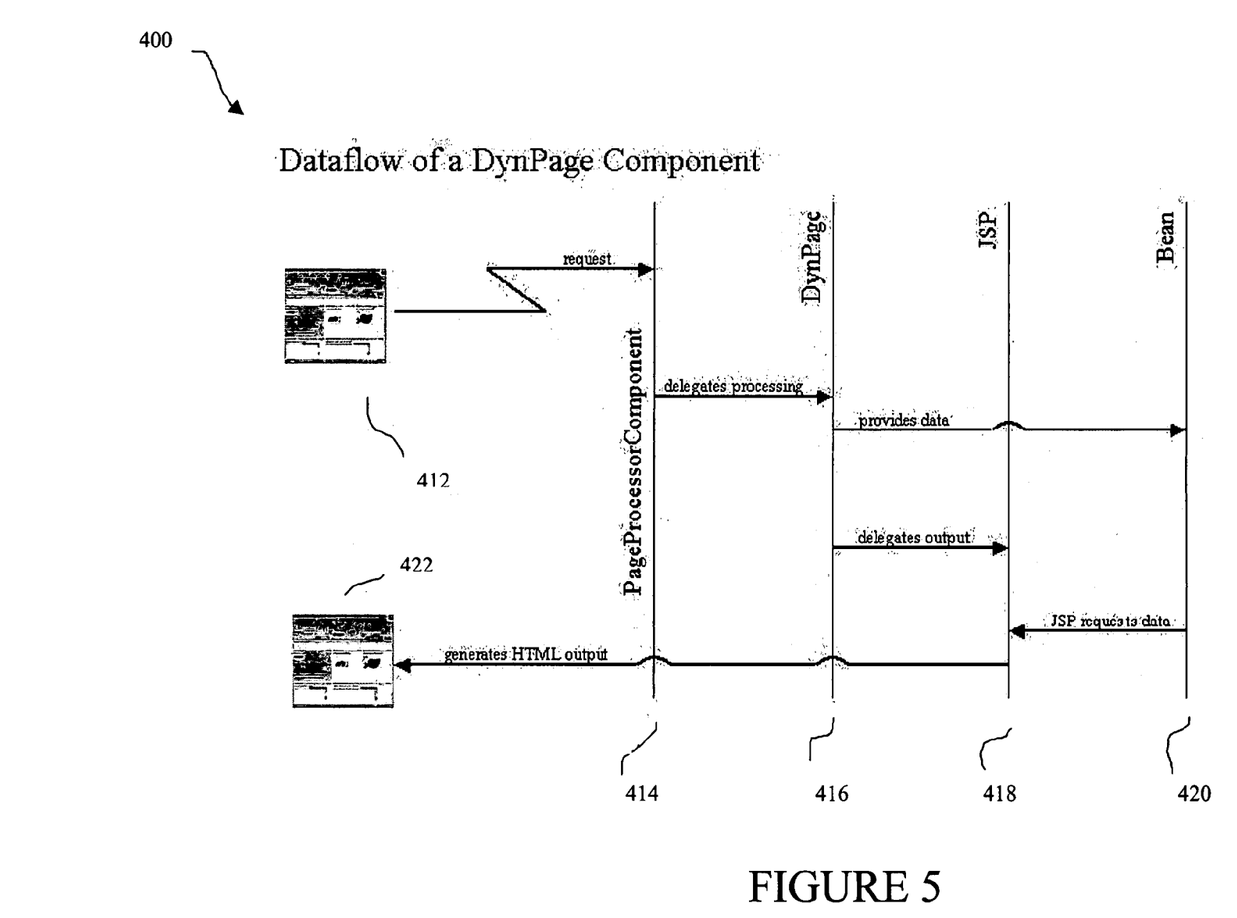
FIG. 5 is a diagrammatic representation of dataflow of a dynamic page component, according to one embodiment of the present invention.
Figure 5A:
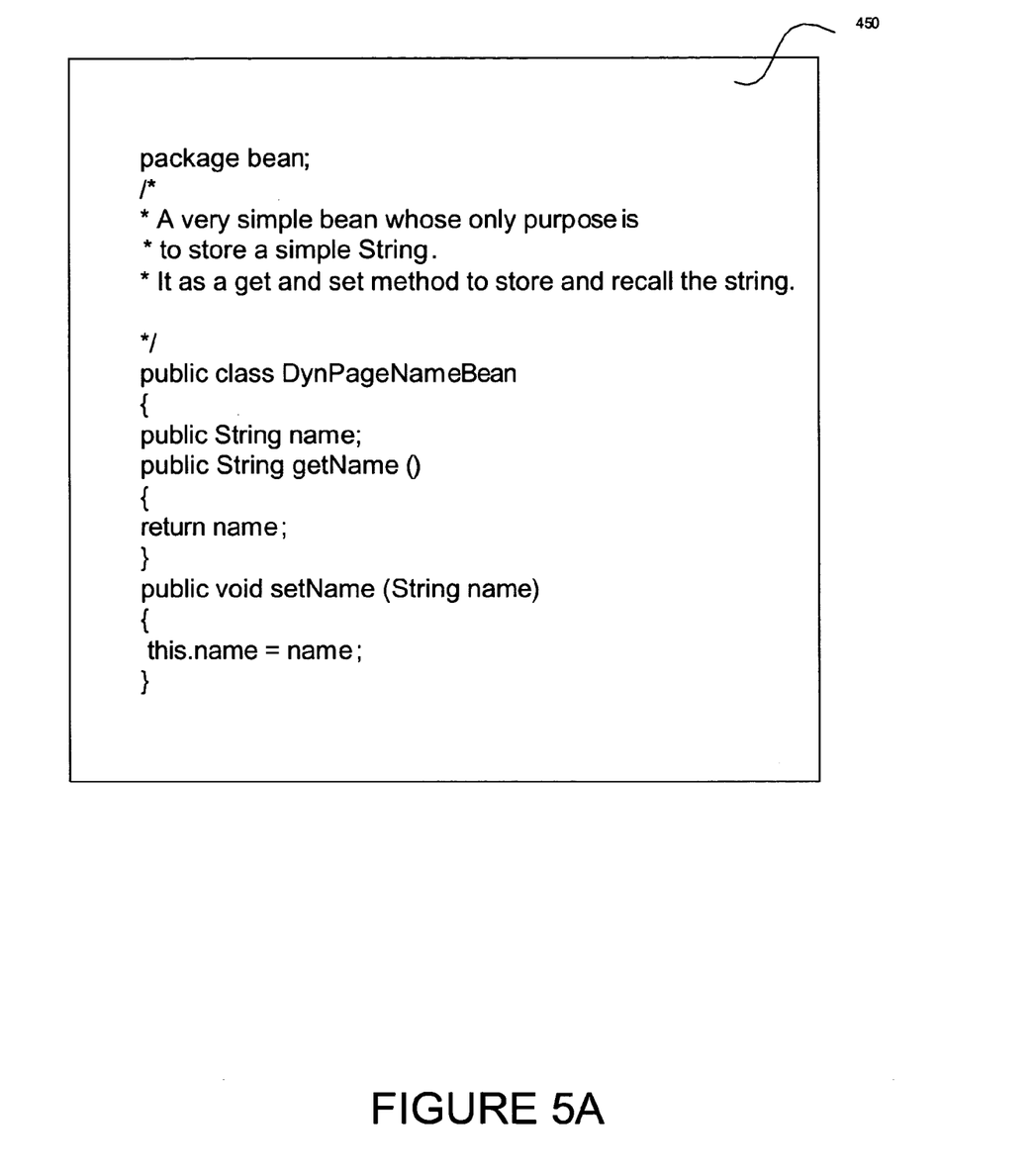
FIG. 5A is an implementation example of a reusable software component as a Java Bean, according to one embodiment of the present invention.

FIG. 4 is a diagrammatic representation of dataflow of the dynamic page component 38, according to one embodiment of the present invention. In FIG. 4, a request from a web page 412 is received at the page processor component 414. The page processor component 414, in one exemplary embodiment, corresponds to the extractor 36 of FIG. 2. The page processor component 414 delegates the request processing to a dynamic page component 416. The dynamic page component 416, in one exemplary embodiment, corresponds to the dynamic page component 38 of FIG. 2. The exchange of data between the dynamic page component 416 and a JSP program 418 occurs by using a reusable software component 420. The reusable software component 420, in one exemplary embodiment, corresponds to the table view component 54 of FIG. 2, and may be implemented as a Java Bean. FIG. 4A is an implementation example 450 of the reusable software component 420 as a Java Bean.

The reusable software component 420 may be used to get and set "dynamic" data. The dynamic page component 416 may provide the reusable software component 420 with project data; and the JSP program 418 may read the project data. For example a user input may be stored in the reusable software component 420 and than displayed as text by the JSP program 418. Thus, the dynamic page component 116 may provide data associated with a request from the web page 412 to a reusable software component 420 (e.g., the table view component 52). The dynamic page component 116 may delegate generation of an output to the JSP program 418. The reusable software component 420 provides the requested data to the JSP program 418. Finally, the JSP program 418 generates HTML output resulting in a web page 422.

It will be noted that the exchange of data between the dynamic page component 416 and a JSP program 418 may also be effectuated utilizing a session object, a context object, or a request object.

Figure 6:
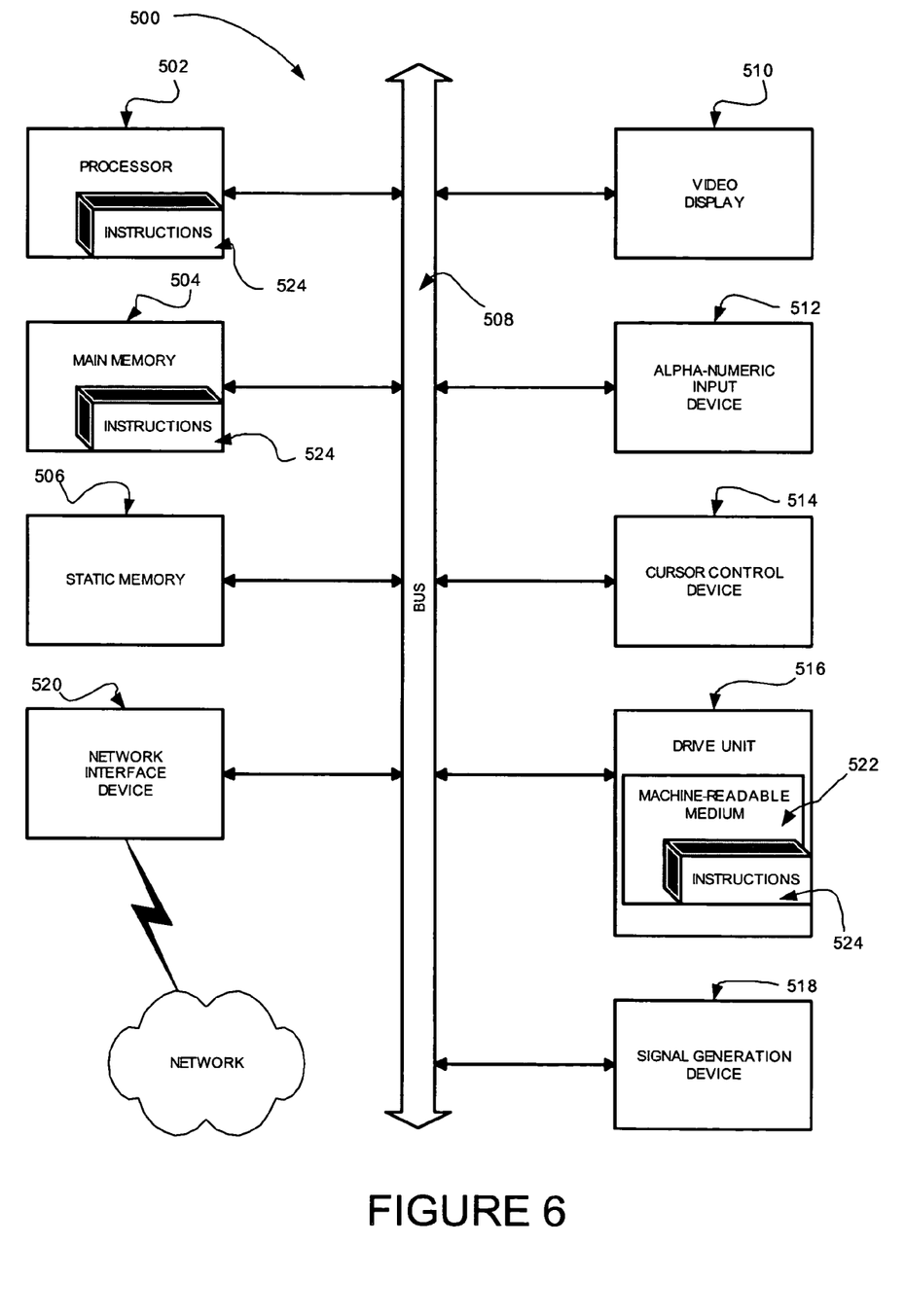
FIG. 6 is a diagrammatic representation of a computer system, within which a set of instructions, for causing the machine to perform any one or more of the methodologies discussed herein, may be executed.

FIG. 6 illustrates a diagrammatic representation of machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to generate chart models have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to create a chart, including:
   an extractor to receive chart data, the chart data including a plurality of values, each value of the plurality of values being associated with a respective abscissa, of a plurality of abscissas, for a category, of a plurality of categories;
   a table model generator to generate a key table model suitable for representing the chart data in a key-value format, the key table model including an abscissas table model, a categories table model, and an abscissas per category table model;
   a chart model template generator to generate a chart model template utilizing the abscissas table model and the categories table model;
   a chart models generator to generate a master chart model utilizing the abscissas per category table model and the chart model template; and
   a display model to render a chart utilizing the master chart model.

2. The system of claim 1, wherein the chart models generator is to generate a new chart model utilizing one or more chart models selected from the master chart model, the abscissas table model and the categories table model.

3. The system of claim 2, wherein the display model is to render a chart utilizing the new chart model.

4. The system of claim 1, wherein the chart is a pie chart.

5. The system of claim 1, wherein the chart is a bar graph.

6. The system of claim 1, wherein the abscissa of the plurality of abscissas includes a plurality of subunits.

7. The system of claim 6, wherein the abscissas table model includes a key-value pair for each subunit.

8. The system of claim 1, including a converter to identify abscissas of non-uniform granularity, the abscissas being from the plurality of abscissas, and to convert the abscissas of non-uniform granularity into abscissas of uniform granularity.

9. The system of claim 8, wherein the converter is to identify values represented by non-uniform units, the values being from the plurality of values, and to convert the values represented by non-uniform units into values represented by uniform units.

10. A method to create a chart, including:
    receiving chart data, the chart data including a plurality of values, each value of the plurality of values being associated with a respective abscissa, of a plurality of abscissas, for a category, of a plurality of categories;
    generating a key table model suitable for representing the chart data in a key-value format, the key table model including an abscissas table model, a categories table model, and an abscissas per category table model;

generating a chart model template utilizing the abscissas table model and the categories table model;

generating a master chart model utilizing the abscissas per category table model and the chart model template; and rendering a chart utilizing the master chart model.

11. The method of claim 10, including generating a new chart model utilizing one or more chart models selected from the master chart model, the abscissas table model and the categories table model.

12. The method of claim 11, including rendering a chart utilizing the new chart model.

13. The method of claim 10, wherein the chart is a pie chart.

14. The method of claim 10, wherein the chart is a bar graph.

15. The method of claim 10, wherein the abscissa of the plurality of abscissas includes a plurality of subunits.

16. The method of claim 15, wherein the abscissas table model includes a key-value pair for each subunit.

17. The method of claim 10, including identifying abscissas of non-uniform granularity, the abscissas being from the plurality of abscissas; and converting the abscissas of non-uniform granularity into abscissas of uniform granularity.

18. The method of claim 10, including identifying values represented by non-uniform units, the values being from the plurality of values; and converting the values represented by non-uniform units into values represented by uniform units.

19. A machine-readable medium having stored thereon data representing sets of instructions which, when executed by a machine, cause the machine to:

receive chart data, the chart data including a plurality of values, each value of the plurality of values being associated with a respective abscissa, of a plurality of abscissas, for a category, of a plurality of categories;

generate a key table model suitable for representing the chart data in a key-value format, the key table model including an abscissas table model, a categories table model, and an abscissas per category table model;

generate a chart model template utilizing the abscissas table model and the categories table model;

generate a master chart model utilizing the abscissas per category table model and the chart model template; and render a chart utilizing the master chart model.

20. A system to create a chart, including:

means for receiving chart data, the chart data including a plurality of values, each value of the plurality of values being associated with a respective abscissa, of a plurality of abscissas, for a category, of a plurality of categories;

means for generating a key table model suitable for representing the chart data in a key-value format, the key table model including an abscissas table model, a categories table model, and an abscissas per category table model;

means for generating a chart model template utilizing the abscissas table model and the categories table mode;

means for generating a master chart model utilizing the abscissas per category table model and the chart model template; and means for rendering a chart utilizing the master chart model.

* * * * *